United States Patent [19]
Marzocchi et al.

[11] Patent Number: 6,042,091
[45] Date of Patent: Mar. 28, 2000

[54] SHOCK ABSORBER

[75] Inventors: Adriano Marzocchi, Bologna; Loris Vignocchi, Zola Predosa; Sandro Musiani, Marzabotto, all of Italy

[73] Assignee: Marzocchi S.P.A., Bologna, Italy

[21] Appl. No.: 08/992,752

[22] Filed: Dec. 17, 1997

[30] Foreign Application Priority Data

Dec. 19, 1996 [IT] Italy ................................ BO96A0669

[51] Int. Cl.[7] ........................................... F16F 9/14
[52] U.S. Cl. ............................. 267/64.15; 188/282.9; 188/285; 188/300; 188/317; 267/64.26; 267/221; 280/275
[58] Field of Search .............................. 267/64.15, 64.26, 267/221, 218, 131, 64.12, 226, 34; 280/275, 276, 277, 278, 279, 280–284; 188/299.1, 269, 281, 282.9, 319.1, 322.19, 317, 285, 322.22, 314, 315, 322.15, 319.2, 288, 300; 244/104 FP

[56] References Cited

U.S. PATENT DOCUMENTS

| | | | |
|---|---|---|---|
| 4,807,860 | 2/1989 | Simons | 280/276 |
| 5,195,766 | 3/1993 | Dohrmann et al. | 280/276 |
| 5,275,264 | 1/1994 | Isella | 267/64.15 |
| 5,284,352 | 2/1994 | Chen | 280/276 |
| 5,310,203 | 5/1994 | Chen | 280/275 |
| 5,346,236 | 9/1994 | Ohma | 280/276 |
| 5,350,185 | 9/1994 | Robinson | 280/275 |
| 5,445,401 | 8/1995 | Bradbury | 280/276 |
| 5,449,188 | 9/1995 | Ohma | 280/276 |
| 5,456,480 | 10/1995 | Turner et al. | 280/276 |
| 5,478,099 | 12/1995 | Kawahara | 280/276 |
| 5,580,075 | 12/1996 | Turner et al. | 280/276 |
| 5,634,652 | 6/1997 | Tsai | 280/276 |
| 5,702,092 | 12/1997 | Farris et al. | 267/64.15 |
| 5,725,226 | 3/1998 | Pariente | 188/300 |
| 5,848,675 | 12/1998 | Gonzalez | 280/276 |

*Primary Examiner*—Douglas C. Butler
*Attorney, Agent, or Firm*—Ward & Olivo

[57] ABSTRACT

The present invention relates to a hydropneumatic shock absorber. This new telescopic system comprises an outer sliding tube, an inner sliding tube having an adjustable braking level of the shock absorber in expansion. Fastened on the base of the outer sliding tube is the bottom of a barrel on which rests counter-acting spring, or other elastic device, which pushes on the inner sliding tube in the expansion stroke. The inner sliding tube carries at its internal end a bell which cooperates with a stop spring when in the expansion stroke. The liquid filled barrel contains an axially movable piston connected to the closure plug assembly of the inner sliding tube by a support tube. The piston contains a first valve, which opens only in the compression phase, and a second valve, which acts as variable throttle and is controlled by the padded end of a screw axially placed within the support tube. The screw axially traverses the support tube and protrudes from the closure plug assembly of the inner sliding tube so that it can be actuated. By acting on this screw, the expansion braking level of the shock absorber can be adjusted.

20 Claims, 4 Drawing Sheets

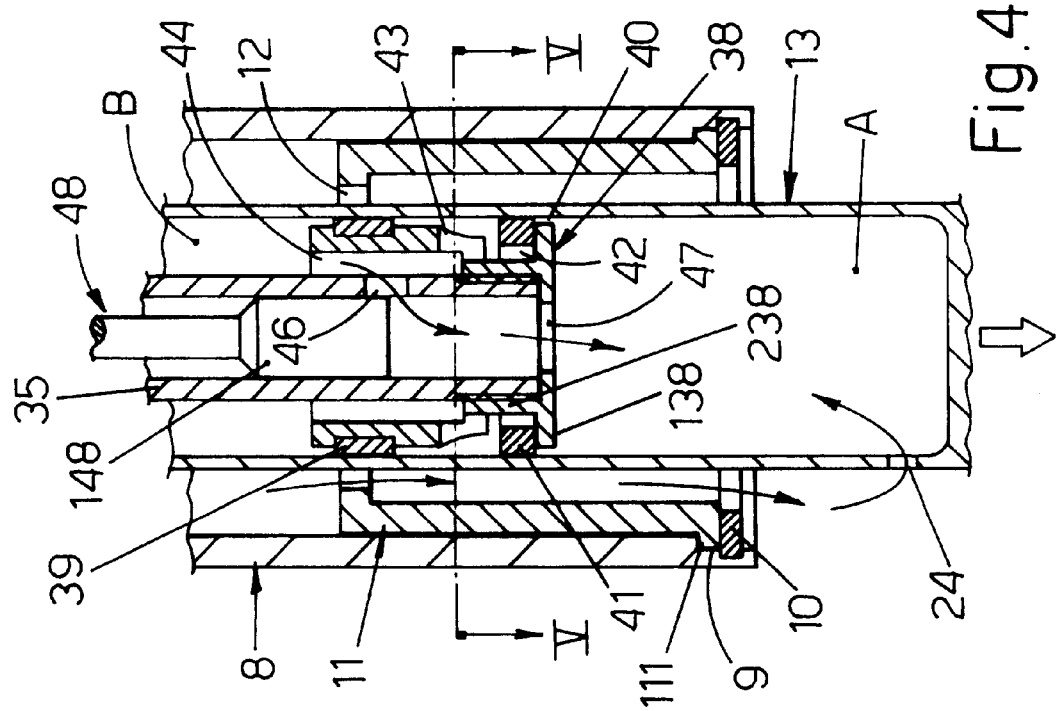
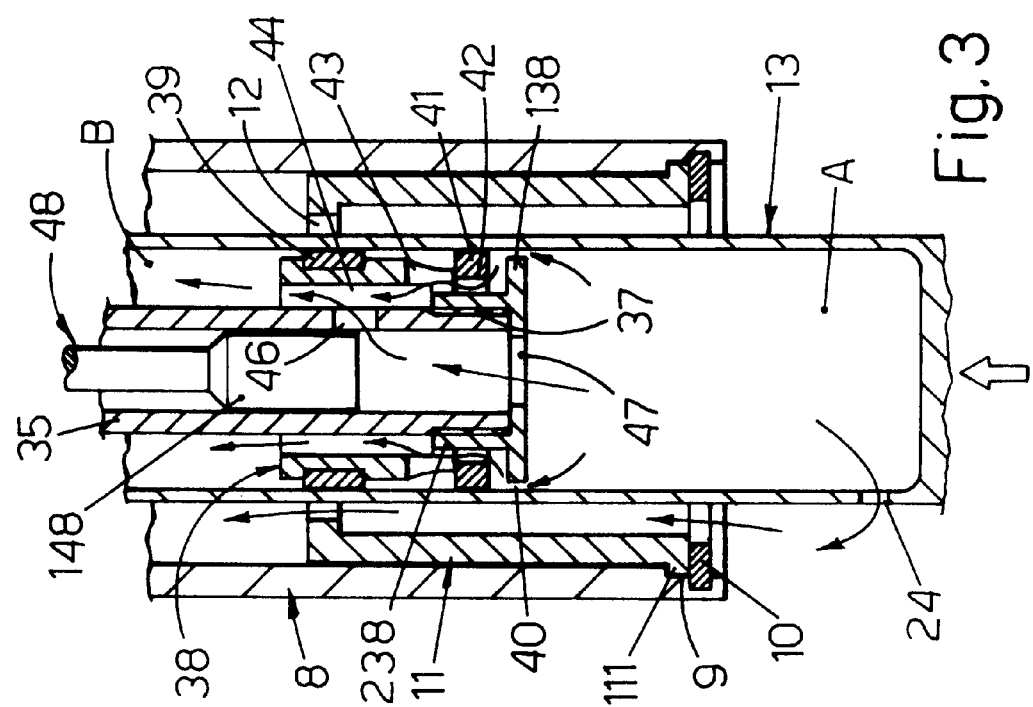

SHOCK ABSORBER

BACKGROUND OF THE INVENTION

The present invention relates to a hydropneumatic shock absorber, adjustable in the braking level in expansion, particularly intended to form, in combination with an equal shock absorber, the telescopic legs of a fork for mountain-bikes, trail-bikes or other bikes or motorbikes.

BRIEF DESCRIPTION OF THE DRAWINGS

The characteristics of the invention, and the advantages deriving from it, will appear evident from the following description of a preferred embodiment of the same, illustrated by way of example in the Figures of the attached drawings, in which:

FIGS. 3 and 4 illustrate enlarged and longitudinally sectioned as in the preceding figures, the portion of the shock absorber equipped with adjustable valve means, respectively in the compression phase and in the expansion phase;

DETAILED DESCRIPTION OF THE INVENTION

Figure 1:
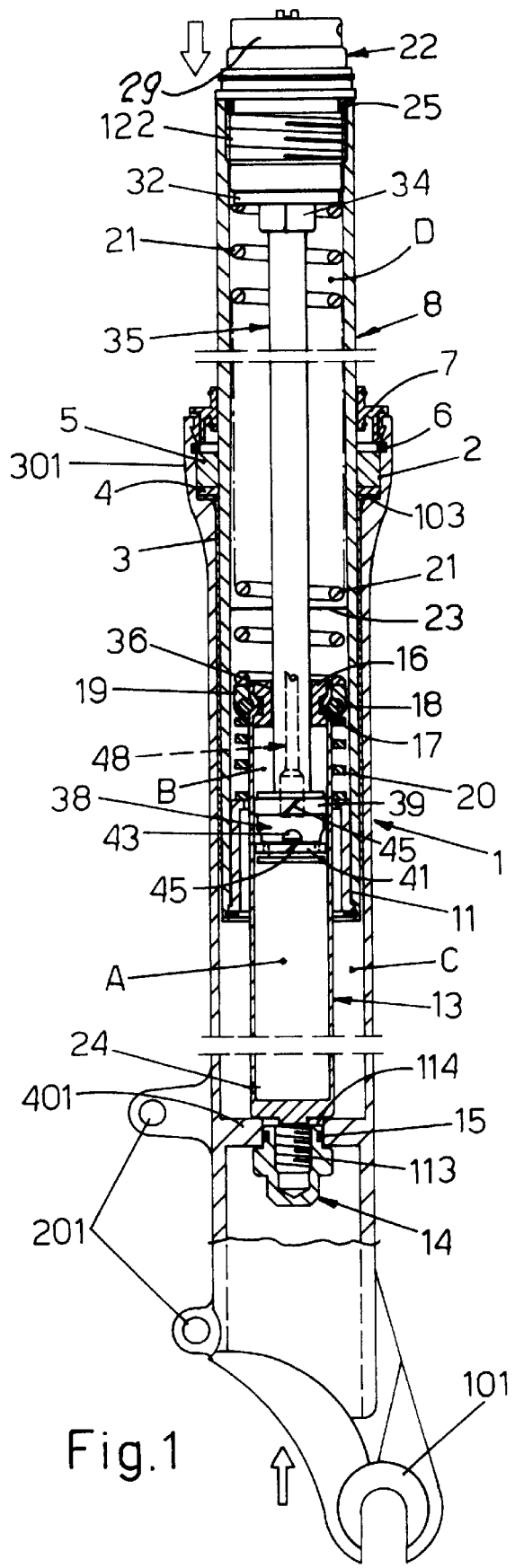
FIGS. 1 and 2 illustrate the shock absorber sectioned lengthwise, respectively in the expanded position and in the compressed position.
Figure 2:
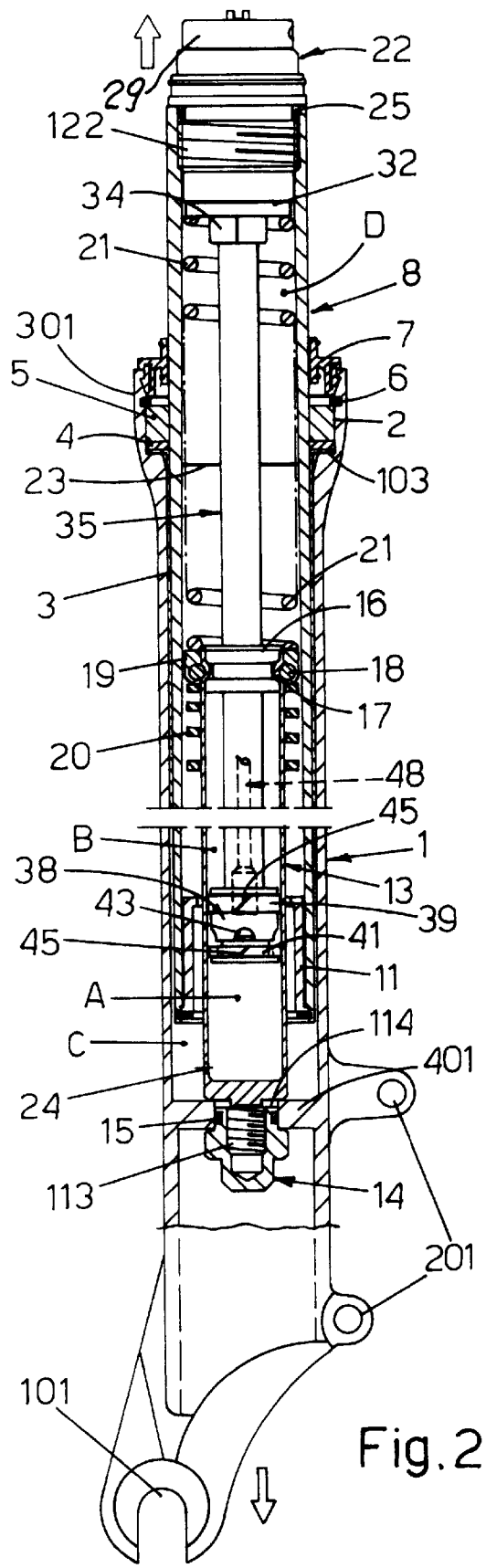

In FIGS. 1 and 2, outer sliding tube 1 of the shock absorber is equipped, for the formation of a stem of a fork for mountain-bike, in the lower part with a fork appendix 101, for the fastening to the axis of the front wheel of the bike and is possibly equipped with additional appendices 201 for the support of a disc brake caliper. The outer sliding tube 1 in the upper part ends with an extended portion 301 with a seat 2 having a diameter greater than that of the internal cavity of the outer sliding tube itself and on the bottom of such seat rests the annular neck 103 of a thin bushing 3 made of "Teflon" (registered trademark) or of other suitable material with a low friction coefficient which is highly wearproof, which covers the cavity of the outer sliding tube for an adequate length (see further on). On the neck 103 of said bushing 3 is positioned a washer 4 of suitable material, surmounted by a sealing ring 5 which is blocked in seat 2 by means of a snap ring 6. Seat 2 is then pre-set to restrain a closing ring 7 with internal parts having the function of dust scraper.

In the cavity of the outer sliding tube 1 there is mounted axially sliding and with lateral seal, through the above mentioned bushing 3, the round section inner sliding tube 8, which by its upper end is fastened to the non illustrated cross-bar, integral with the inner sliding tube of a telescopic system equal and parallel to the one in question and which carries the steering axis. The lower end of the inner sliding tube 8 is internally equipped with an annular recess 9 (see also FIGS. 3 and 4) in which stays and is axially blocked by the snap ring 10 and the annular neck 111 of a bell 11, and which is open in the upper part and traversed, with the clearance 12, by a round section small cylindrical tube or barrel 13. Barrel 13 is made with a suitable light alloy and provided in one piece, on the bottom, with a threaded axial shank 113 screwed in a cap nut 14 which in turn is equipped with a truing threaded axial shank 114 which engages with precision and with lateral seal, through the gasket 15, a hole obtained at the centre of the raised base 401 of the outer sliding tube 1. The outer sliding tube 1 is open at the lower end to allow access to the base 401 and to the nut 14. The barrel 13 is closed in the upper part by a plug 16 laterally equipped with an annular recess 17 in which a corresponding lateral portion of the barrel 13 is headed. In such annular recess 17 is set an open snap ring 18, on which a cap 19 is rested in the upper part and rimmed in the lower part. Against the lower end of such cap rests the end of a helical spring 20 which with the other end rests against the top of the lower bell 11. of the inner sliding tube 8 when this is in the position of maximum expansion as from FIG. 1. The spring 20 is preferably made with a square or rectangular section. On the upper end of the cap 19 rests at least one helical counter-acting spring 21 which concerns the inner sliding tube 8 for its entire length and which is held in this by a plug 22 equipped with means for preloading this spring 21 whose function is to urge the inner sliding tube 8, in expansion and to absorb the compression stress to which the telescopic system in question is subjected by the roughness of the ground.

The bushing 3 placed between the outer sliding tube 1 and the inner sliding tube 8, is of such length as to guide the inner sliding tube 1 itself, but not such as to protrude in the lower part from it when the inner sliding tube itself is in the position of maximum expansion as from FIG. 1. This solution enables to considerably limit the thickness of the bushing 3 with economical and functional advantages and ensures that such bushing is always correctly held between the parts whose sliding and lateral seal it controls.

Before mounting the plug 22, which with its own externally threaded shank 122 is screwed in a corresponding internally threaded portion of the upper end of the outer sliding tube 1, in the outer sliding tube itself there is introduced a correct amount of a suitable liquid which preferably goes over the cap 19, crossing the clearance existing between the cap itself and the internal lateral surface of the inner sliding tube 8, for example up to the line of the level indicated with 23 in FIG. 1 and such fluid completely fills the free chamber C of the outer sliding tube 1 and completely fills the barrel 13 in which it can flow through at least one lower hole 24 of suitable section. The plug 22 is equipped with a gasket 25 for the seal connection on the inner sliding tube (FIG. 6) and is axially drilled for the passage of the upper tapered section 126, with lateral seal 27, of a screw 26 which is axially held in place by a snap ring 28 and which can be actuated through an external knob 29. On screw 26 is screwed a nut screw 30 externally equipped with teeth 130 which bind some corresponding longitudinal recesses 31 of the lateral surface of the axial cavity of the plug in which lodges the said screw-nut screw group. On the lower end of the nut screw 30 rests with the interpositioning of a truing cap 32, the upper end of the counter-acting spring 21. By acting on the knob 29, it will be possible to rotate the screw 26 and determine the ensuing axial shifting of the nut screw 30 towards the bottom, preloading the spring 21 to the desired point. It is understood that on top of the plug 22 and on the knob 29 could be included some reference marks (not shown), to enable the user to modify at will the level of compression of the counter-acting springs of the fork, even without the use of special fixtures.

Figure 6:
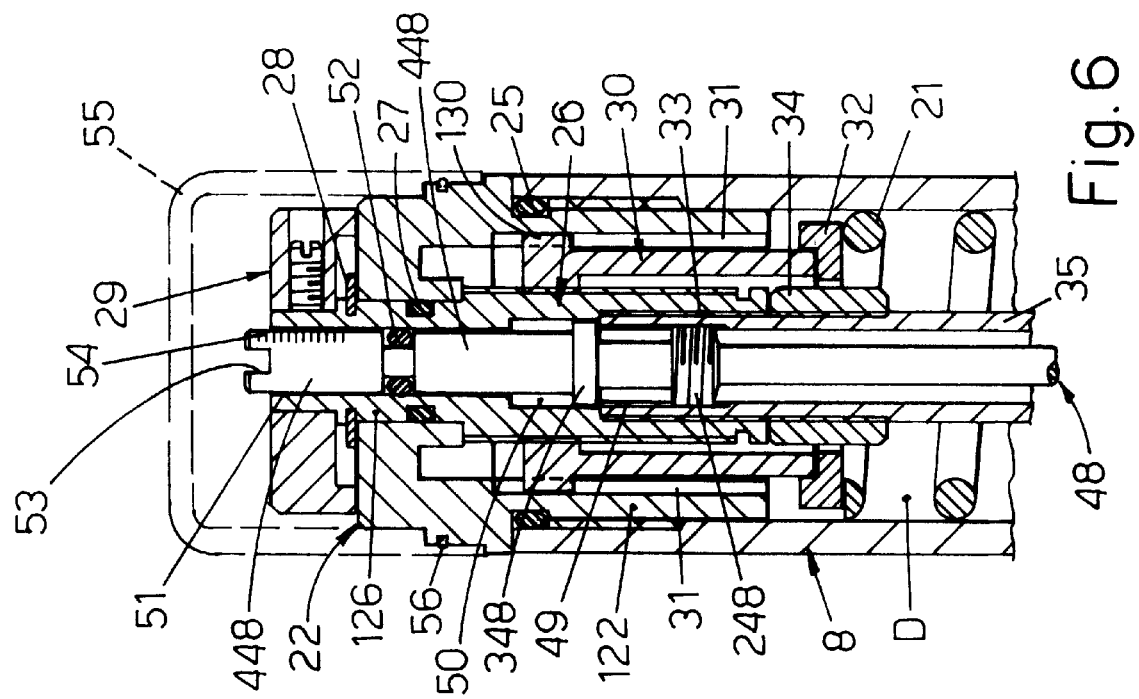
FIG. 6 illustrates, longitudinally sectioned and enlarged, the upper part of the inner sliding tube of the shock absorber shown in FIGS. 1 and 2.
Figure 5:
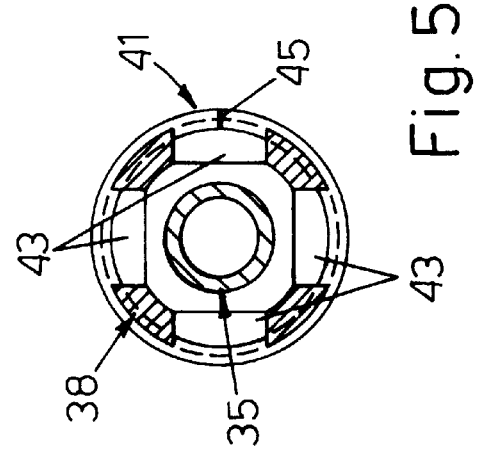
FIG. 5 illustrates some details according to section line V—V of FIG. 4.

It can be seen from reviewing FIG. 6 that the adjustment screw 26 is equipped with an axial cavity subdivided in three sections with the diameter decreasing towards the top. The lower section 33 is threaded and in it there is screwed and axially blocked by means of the lock nut 34, the end of a tube 35. The tube 35 extends towards the bottom and passes through a hole 36 in the plug 16, entering the barrel 13 where it terminates with an externally threaded end 37 on which is screwed the bottom of the body of a small goblet-shaped piston 38. Piston 38 includes an external annular counterbore with at least one gasket 39 which operates as a lateral seal against the barrel 13. The base 138 of the piston 38 has a diameter suitably lesser than the internal diameter of the barrel 13, so that between the two parts there is a permanent annular passage 40 of the right width. On the same base 138 is included a ring 41 of suitable plastic material, which operates as a lateral seal against the barrel 13 and whose internal diameter is greater than the external diameter of the stem 238 of the piston 38, so that between the two parts there is a permanent annular passage 42. The height of the ring 41 is opportunely lesser than that of the stem of the piston 38, so that when the telescopic assembly in question is stressed by compression, as from FIG. 3, said ring 41 is lifted, it moves away from the base 138 and rests on the bottom of the body of the same piston where, as illustrated in the detail of FIG. 5, are opened some radial holes 43 which communicate with the toric cavity 44 existing between the same body of the piston 38 and the rod 35 which carrys it. The ring 41 and the seal gasket 39 are made with a wearproof material, for instance with an appropriate relatively rigid and non elastic plastic material, which allows them to be lodged in their respective seats thus making the piston 38 in several pieces. Alternatively they can be provided with an oblique cut 45, which forms flute spout ends, respectively inclined and which reciprocally overlap with good seal condition with respect to the barrel 13 (FIGS. 1 and 5).

In the cavity 44 of the piston 38 is opened at least one hole 46 obtained laterally in the tube 35. The base 138 of the same piston is axially provided with a hole 47. In the tube 35 there is located a rod 48 which ends in the lower part with a cylindrical head 148 fit to be located with an adjustable level of interference in front of said hole 46, so as to modify its passage port. For this purpose, the rod 48 is equipped in the upper part with the following means (see FIG. 6):

- a padded and threaded portion 248 which co-operates with a corresponding internally threaded section 49 of the upper extremity of the tube 35;
- an upper annular portion 348 which acts as counterboring for the screwing and unscrewing of said rod 48, in the co-operation respectively with the upper end of the tube 35 and with the top of the intermediate section 50 of the axial cavity of the screw 26;
- a terminal portion 448 which goes through the upper and lower diameter section of the axial cavity of the screw 26, which is equipped with a lateral seal gasket 52 and which protrudes from the top of the same screw with a section of the right length, equipped with an axial holding snap ring 28 and equipped at the end with a diametrical cut 53 to be activated with a screwdriver or other mean. By screwing and unscrewing the rod 48 within the limits allowed by the counterboring 348, it is possible to modify the passage port of the hole 46, up to the complete opening or complete closing of such hole.

In the compression phase of the shock absorber, as illustrated in FIGS. 1 and 3, the ring 41 is lifted against the bottom of the body of the piston 38 and the liquid contained in the lower chamber A of the barrel 13, flows in the upper chamber B of the same barrel through the openings 40, 42, 43, 44, and also through the shunt represented by the hole 47, by the cavity of the rod 35 and by the passage of the hole 46. However, possible variations in the rate of flow of this last shunt do not appreciably modify the behaviour of the shock absorber. Since chamber A has a volume greater than that of chamber B, the exceeding liquid of the same chamber A flows in chamber C external to the barrel 13, through the lower hole 24 of the barrel 13. Given that in the compression phase, chamber C also decreases in volume, the liquid of this chamber flows through the opening 12 of the bell 11, goes through clearance present between the cap 19 and the internal lateral surface of the inner sliding tube 8 and raises the level 23 of the liquid in the chamber D partially occupied by air, which decreases in volume and is compressed with an elasticity which is added to that of the counter-acting spring 21 (see FIG. 2).

The compression phase of the shock absorber can be progressively stopped, by a gradual decrease in the clearance between the cap 19 and the inner sliding tube 8, determined by a correct internal taper of the same inner sliding tube, whereby the internal diameter of this component progressively decreases upwards, as illustrated in FIGS. 1 and 2.

In the expansion phase of the shock absorber, the liquid follows an inverse route to that previously considered. In this phase the ring 41 shifts downwards as from FIGS. 2 and 4 and by resting on the foot 138 of the plunger 38, closes the passage 40 so that the liquid can flow from the upper chamber B to the lower one A of the barrel 13, exclusively through the shunt 44, 46, 47. By modifying the passage of the hole 46, by screwing or unscrewing the rod 48, it will be possible to change at will the level of braking in expansion of the shock absorber. To facilitate the adjustment carried out by means of the rod 48, on the upper part 448 of the same rod can be included some reference marks 54 which can be read when they protrude from the top of the screw 26, as illustrated in FIG. 6. In this same figure, reference numeral 55 and the broken lines indicate a possible protection cap which can be pressure mounted on the top equipped with lateral friction means 56 of the upper plug 22 of the inner sliding tube 8.

It is clear that, by unscrewing the screw nut 14 and the plug 22, it is possible to disassemble the shock absorber in all its components. By removing the snap ring 6 it will be possible to remove and replace the sliding bushing 3 when it is worn out.

While the present invention has been described with reference to one or more preferred embodiments, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention.

We claim:

1. A telescopic system for an adjustable hydropneumatic shock absorber, said telescopic system comprising:
   an inner sliding tube having a first plug assembly attached at one end of said inner sliding tube and a first elastic means positioned within the internal cavity of said inner sliding tube;
   an outer sliding tube having a closed end comprising attachment means for fastening to a wheel axis and an open end for telescopically mounting said inner sliding tube; and
   an adjustment means comprising:
   at least one valve means;
   a barrel which is closed at a first end by a second plug assembly and fastened at a second end to said closed end of said outer sliding tube;

a piston positioned within said barrel creating an upper and a lower chamber, and comprising a first valve means for allowing the flow of fluid in a compression phase and a second valve means for allowing the flow of said fluid in expansion and compression phases, both of which control the passage of said fluid between said upper chamber and said lower chamber; and a support tube connected to said first plug assembly and to said piston wherein said support tube axially traverses said second plug assembly;

wherein said telescopic system has at least one internal chamber arranged such that the liquid contained therein flows through at least one of said valve means;

wherein said second valve means is adjustable by means of an adjustment screw positioned axially within said support tube and which protrudes with lateral seal from said first plug assembly.

2. A telescopic system according to claim 1, wherein the internal cavity of said inner sliding tube is slightly tapered, such that the internal diameter of said internal cavity decreases toward said threaded end of said inner sliding tube.

3. A telescopic system according to claim 1, wherein said piston cooperates in lateral seal with said barrel through at least one annular gasket, and wherein said piston is provided with a threaded axial hole in which a threaded end of said support tube is screwed, said threaded end having at least one lateral hole which externally communicates with the internal cavity of said piston and the upper chamber of said barrel, and which internally communicates with the internal cavity of said support tube and the lower chamber of said barrel, said support tube including a rod having an enlarged lower end and an upper end with an enlarged threaded section which cooperates with a corresponding internally threaded upper end of said support tube, said rod including abutment means to limit its axial movement, the upper end of said rod being traversed with lateral seal, and wherein said first plug assembly has a rotatable section.

4. A telescopic system according to claim 1, wherein said first plug assembly is axially traversed with lateral seal by the tapered stem of an externally threaded screw which cooperates with a ring nut placed in an internal cavity of said first plug assembly, said threaded screw having longitudinal grooves engaged by external projections of said ring nut, said ring nut resting on the upper end of said elastic means to enable the preloading of said elastic means, said threaded screw being axially locked in said first plug assembly by an external snap ring, and said threaded screw having one end protruding from said first plug assembly.

5. A telescopic system according to claim 4, wherein said support tube comprises a rod which protrudes from the top of said first plug assembly and which is provided with reference markings which enable the precise control of the axial position of said rod.

6. A telescopic system for an adjustable hydropneumatic shock absorber, said telescopic system comprising an outer sliding tube having a closed end and an open end, wherein said closed end is equipped with attachments for fastening to a wheel axis, and wherein said open end provides for telescopically mounting an inner sliding tube, wherein said inner sliding tube has at one end a first plug assembly, and wherein said inner sliding tube includes elastic means to stress in the expansion of said telescopic system whose internal chambers are partially occupied by air and partially by liquid, said chambers being arranged in such a way that, in the expansion phase of said telescopic system, said liquid flows through a valve means to adequately slow the expansion stroke of said telescopic system, and a closed end of a barrel is internally and coaxially fastened at a closed end of said telescopic system, said barrel having a length proportional to the stroke of said telescopic system and said barrel being closed by a second plug assembly axially traversed by a support tube integral with said first plug assembly, said support tube attached to a piston which delimits upper and lower opposite pressure chambers in said barrel both containing said liquid, and said barrel having a lower chamber in permanent communication with a chamber of the telescopic system containing said liquid through at least one lower hole, wherein said piston comprises first and second valve means which control the passage of said liquid between said upper and lower chambers of said barrel, wherein said first valve means is open in the compression phase and closed in the expansion phase of said telescopic system, and wherein said second valve means is open both in the compression and expansion phases and is adjustable by means of an adjustment screw positioned axially within said support tube and which protrudes with lateral seal from said first plug assembly.

7. A telescopic system according to claim 6, wherein said barrel is provided with a lower shank for fastening said barrel axially and with lateral seal to the base of said outer sliding tube.

8. A telescopic system according to claim 7, wherein said lower shank is attached to a cap nut having a section which engages a central hole on the base of said outer sliding tube and having an annular recess for at least one gasket to cooperate with a lateral seal of said central hole.

9. A telescopic system according to claim 7, wherein said second plug assembly has an external annular recess in which part of the lateral surface of said barrel is headed and in which is lodged an open ring on which a cap rests which is rimmed on a surface adjacent to said open ring, and on top of said cap rests said first elastic means whose opposite end rests against said first plug assembly, while on the lower side of said cap rests a second elastic means whose opposite end rests against the top of a bell integral with the lower end of said inner sliding tube, said second elastic means providing end-of-stroke expansion dampening of the telescopic system.

10. A telescopic system according to claim 9, wherein said second plug assembly has an external diameter less than the inner diameter of said inner sliding tube allowing said liquid to flow therebetween.

11. A telescopic system according to claim 9, wherein said second plug assembly has an external diameter such as to slide guided on the internal surface of said inner sliding tube, said second plug assembly having peripheral openings for the free passage of said liquid.

12. A telescopic system according to claim 11, wherein the internal cavity of said inner sliding tube is tapered, such that the internal diameter of said internal cavity decreases toward the end of said inner sliding tube having said first plug assembly and such that the space between the inner wall of said inner sliding tube and said second plug assembly decreases in the compression phase of said telescopic system.

13. A telescopic system according to claim 6, wherein said piston is in the shape of a goblet and cooperates with lateral seal with said barrel through at least one annular gasket mounted on said piston, and wherein said piston is provided with a threaded axial hole in which an end of said support tube is screwed, said end of said support tube having at least one lateral hole which externally communicates with the internal cavity of said piston and the upper chamber of said barrel, and which internally communicates with the internal cavity of said support tube and the lower chamber of said barrel, said support tube including a rod having an enlarged lower end and an upper end with an enlarged threaded section which cooperates with a corresponding internally threaded upper end of said support tube, said rod including abutment means to limit the axial movement of said rod, an end of said rod being traversed with lateral seal, and wherein said first plug assembly has a rotatable section.

14. A telescopic system according to claim 13, wherein an end of said rod modifies the passage of the interconnection hole of the internal chambers of said barrel, and wherein said rod carries an annular projection which provides for maximum closure and maximum opening of said passage.

15. A telescopic system according to claim 13, wherein said piston has equally distributed radial openings which communicate with said piston and with the internal cavity of said piston, said internal cavity opening into the upper chamber of said barrel, and wherein said piston is mounted with clearance with respect to a second annular gasket which acts with lateral seal with the internal surface of said barrel and which realizes said first valve means.

16. A telescopic system according to claim 15, wherein said second annular gasket is made of a rigid plastic material and is equipped with an oblique cut.

17. A telescopic system according to claim 13, wherein said first annular gasket is made of a rigid waterproof plastic material and is equipped with an oblique cut to form a flute spout end.

18. A telescopic system according to claim 6, wherein said first plug assembly is axially traversed with lateral seal by the tapered stem of an externally threaded screw which cooperates with a ring nut placed in an internal cavity of said first plug assembly, said threaded screw having longitudinal grooves engaged by external projections of said ring nut, said ring nut resting on said elastic means to enable the preloading of said elastic means, said threaded screw being axially locked in said first plug assembly by an external snap ring, and said threaded screw protruding from said first plug assembly.

19. A telescopic system according to claim 18, wherein said threaded screw has an axial cavity subdivided into a first section, a second section and a third section, said axial cavity having a diameter decreasing toward said first plug assembly, wherein said first section has means for connecting said support tube, wherein said second section and said third section are traversed by said support tube.

20. A telescopic system according to claim 19, wherein the end of said support tube which protrudes from said first plug assembly is provided with reference markings which enable the precise control of the axial position of said support tube.

* * * * *